United States Patent
Criado Abad et al.

(10) Patent No.: US 8,605,263 B2
(45) Date of Patent: Dec. 10, 2013

(54) WIND TURBINE BLADES STRAIN MEASURING SYSTEM DURING STATIC TESTS

(75) Inventors: Alfredo Criado Abad, Sarriguren (Navarra) (ES); Miguel Riezu Corpas, Sarriguren (Navarra) (ES); Antonio Fernandez Lopez, Madrid (ES); Alfredo Güemes Gordo, Madrid (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 209 days.

(21) Appl. No.: 13/146,954

(22) PCT Filed: Jan. 30, 2009

(86) PCT No.: PCT/ES2009/000052
§ 371 (c)(1),
(2), (4) Date: Jul. 29, 2011

(87) PCT Pub. No.: WO2010/086466
PCT Pub. Date: Aug. 5, 2010

(65) Prior Publication Data
US 2011/0292372 A1 Dec. 1, 2011

(51) Int. Cl.
*G01B 11/16* (2006.01)
(52) U.S. Cl.
USPC .............................. 356/32; 356/34
(58) Field of Classification Search
USPC ........ 356/32, 34, 35, 73.1, 35.5, 477; 385/12; 290/44, 55; 702/42; 700/287, 275, 286; 416/31, 35, 40, 43, 61; 415/1, 118; 250/227.14, 227.15, 227.16, 227.18, 250/227.19, 227.23, 227.24, 227.28, 226, 250/227.27; 73/583, 655–659, 800
See application file for complete search history.

(56) References Cited

U.S. PATENT DOCUMENTS

| | | | |
|---|---|---|---|
| 6,545,760 B1 | 4/2003 | Froggatt et al. | |
| 7,130,496 B2 * | 10/2006 | Rogers | 385/11 |
| 2011/0054696 A1 * | 3/2011 | Olesen | 700/275 |

FOREIGN PATENT DOCUMENTS

| | | |
|---|---|---|
| EP | 1 359 321 A1 | 11/2003 |
| EP | 1 780 523 A1 | 5/2007 |
| GB | 2 440 955 A | 2/2008 |

OTHER PUBLICATIONS

International Search Report dated Oct. 9, 2009 for Application No. PCT/ES2009/000052.
Shimizu, K., et al., "Measurement of Rayleigh backscattering in single-mode fibers based on coherent OFDR employing a DFB laser diode", Phonics Technology Letters, IEEE, vol. 3, No. 11, abstract.

* cited by examiner

*Primary Examiner* — Tri T Ton
(74) *Attorney, Agent, or Firm* — Ladas & Parry LLP

(57) ABSTRACT

A current transformer (5) having a plurality of primary and secondary windings, comprising a top Strain measuring system of wind turbine blades (11) during the performance of static tests that comprises an equipment for measuring the strain at multiple locations in mono-mode optical fibers (5, 7, 9) using Rayleigh scattered light, that includes an OBR interrogator (23), an interface device (25) and an Acquisition System (27), said mono-mode optical fibers (5, 7, 9) being attached to the blade (11) subjected to said tests for obtaining high spatial resolution measurements of the blade strain during said tests. Said optical fibers (5, 7, 9) may be placed whether in a longitudinal direction or in a non-longitudinal direction or in a non-linear shape in given blade sections and may be bonded whether to the outer skin (31) of the blade (11), or into grooves (51, 53) in the outer skin (31) of the blade (11) or embedded between two structural laminates (33, 35) of the blade (11).

19 Claims, 2 Drawing Sheets

WIND TURBINE BLADES STRAIN MEASURING SYSTEM DURING STATIC TESTS

FIELD OF THE INVENTION

This invention relates to the static tests performed to wind turbine blades for certification and other purposes and in particular to the systems used for measuring strain in said tests.

BACKGROUND

Current wind turbine blade certification requires performing several static tests on the blade to confirm the blade capability to withstand the expected loads, particularly static strength tests to check the blade behaviour under extreme design loads, fatigue tests to check the blade's ability to withstand the operating loads for its design life and other tests in order to characterize physical properties of the blade such as weight, centre of gravity or natural modes and frequencies.

These tests are usually carried out in a test bench in which the blade is bolted to a rigid structure and then static or dynamic loads are applied to the blade by means of different methods.

Current test systems rely on a set of strain gauges to determine the strain distribution along blades. With the increasing size of blades, the amount of necessary gauges is rapidly growing, which implies larger efforts to adequately estimate the aforementioned distribution. With two to four electrical wires per gauge, cabling volume, complexity and vulnerability to electro-magnetic interference become significant and disturbing. Additionally, the discrete nature of this kind of measurements implies loss of information in case of non-linear behaviour in the area between two strain gauges.

This invention is intended to the solution of said problems.

SUMMARY OF THE INVENTION

It is an object of the present invention to provide a wind turbine blades strain measuring system in static tests having a high strain resolution.

It is another object of the present invention to provide a wind turbine blades strain measuring system in static tests having a high spatial resolution.

It is another object of the present invention to provide a wind turbine blades strain measuring system in static tests that facilitates the detection and evaluation of local and global non-linear behaviour such as stress concentrations, buckling or buckling shapes.

It is another object of the present invention to provide a wind turbine blades strain measuring system in static tests that can be installed fastly and easily.

These and other objects are met by providing a strain measuring system of wind turbine blades during the performance of static tests comprising an equipment for measuring the strain at multiple locations in mono-mode optical fibres using Rayleigh scattered light, said mono-mode optical fibres being attached to the blade subjected to said tests for obtaining high spatial resolution measurements of the blade strain during said tests. It is important to note that within the meaning of this invention, a static test of a wind turbine blade shall be understood as any test carried out applying a load to a wind turbine blade attached to a rigid structure in a test bench.

In preferred embodiments, the optical fibres are placed whether in a longitudinal direction or in a non-longitudinal direction or in a non-linear shape in given blade sections. Hereby, the system allows obtaining the strain measurements in different locations along the blade for a better adaptation to different requirements.

In a preferred embodiment suitable for certification purposes, the system comprises four optical fibres placed, respectively, along the blade leading edge, the blade trailing edge, the blade upper cap and the blade lower cap. Hereby it is achieved an improved system for obtaining the strain measurements needed in the static tests required for certification purposes.

In another preferred embodiments the optical fibres are bonded to the outer skin of the blade, into grooves in the outer skin of the blade or embedded between two structural laminates of the blade. Hereby, the system allows obtaining the strain measurements in different locations in the transversal section of the blade for a better adaptation to different requirements.

Other features and advantages of the present invention will be understood from the following detailed description in relation with the enclosed drawings.

DETAILED DESCRIPTION OF PREFERRED EMBODIMENTS

A typical wind turbine blade may have a length between 20 and 60 meters or more and it is constructed with composite materials such as glass-reinforced plastics (GRP). There are so many factors that can damage a wind turbine blade such as fatigue, wind gusts, lightning strikes, aerodynamic interaction between wind turbines, some of them causing unpredictable loads on the blade, that it is very important to have good blade strain measurement systems to be used in static tests not only for certification purposes but also to provide valuable information regarding the behavior of a blade subjected to predetermined loads, particularly the deflections and strains of a cantilevered blade.

Figure 1:
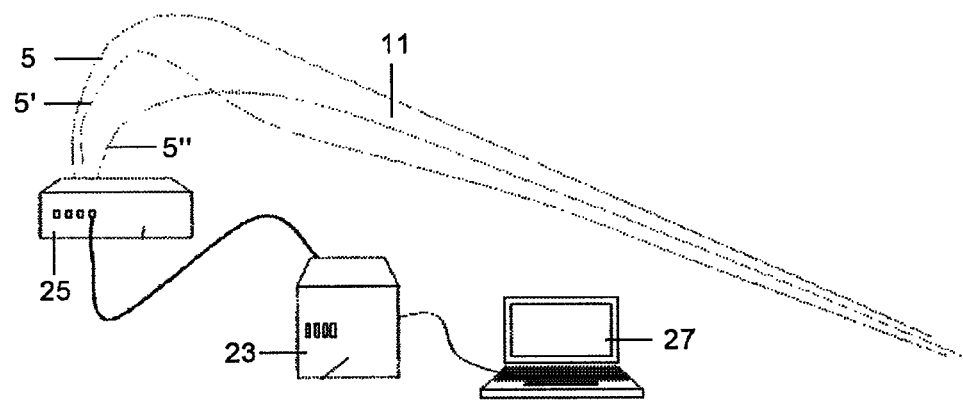
FIG. 1 depicts a strain measurement system according to the present invention.

Following FIG. 1 it can be seen that a wind turbine blades strain measurement system in static tests according to the present invention comprises:

a) A plurality of mono-mode optical fibres 5, 5', 5'" attached to the blade 11 which is subjected to said tests.

b) An equipment for measuring the strain in said fibres 5, 5', 5" through changes in their optical behaviour in the course of said tests, including:

b1) An Optical Backscattering Reflectometry (OBR) interrogator 23 to acquire optical signals from the fibres 5, 5', 5" and convert them to strain data.

b2) An interface device 25 to connect said fibres 5, 5', 5" to said OBR interrogator 23.

b3) An Acquisition System 27, typically a dedicated computer, for receiving and processing the strain data provided by the OBR interrogator 23.

Said equipment makes use of a known technology for effecting high-spatial resolution distributed strain measurement in optical fibres using Rayleigh scattered light and particularly in an unaltered, commercial grade, mono-mode optical fibre at multiple locations by measuring the local shift in the Rayleigh spectral shift. Specifically, said technology effects a comparison of the spectrum before and after loading the fibre using a complex cross-correlation of the spectra corresponding to load and zero-load conditions. This technology currently allows achieving a strain resolution in the range of $\pm 1\mu\epsilon$ and a spatial resolution of at least 0.5 mm. Further information about this technology can be found in U.S. Pat. No. 6,545,760.

Figure 2:
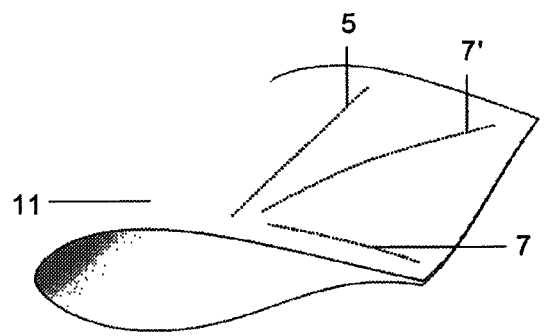
FIG. 2 shows three different deployment patterns of a single optical fibre: longitudinal, traverse and diagonal.

As shown in FIG. 2, the system can include optical fibres 5 deployed longitudinally along the wind turbine blade 11 and optical fibres 7, 7' deployed in traverse and diagonal directions with respect to the blade longitudinal axis. The system will preferably comprise optical fibres 5 deployed longitudinally along at least the 50% of the blade length to provide the basic strain data required in static tests but optical fibres 7, 7' deployed in non-longitudinal directions may also be needed for providing additional or specific strain data in local areas.

Figure 3:
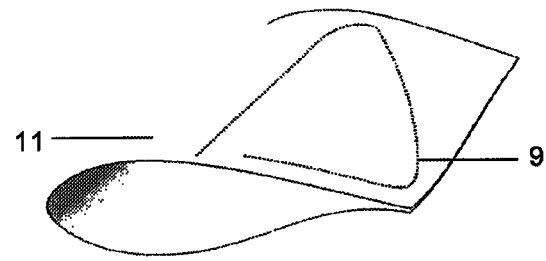
FIG. 3 shows another possible deployment pattern of a single optical fibre including non-linear segments.

The system can also include, as shown in FIG. 3, optical fibres 9 including non-linear segments. With configurations including turning and/or bending segments, a single optical fibre 9 can cover a big area of the blade 11 so that the number of single optical fibres can be reduced, minimizing the number of required acquisition channels in the equipment.

Figure 4:
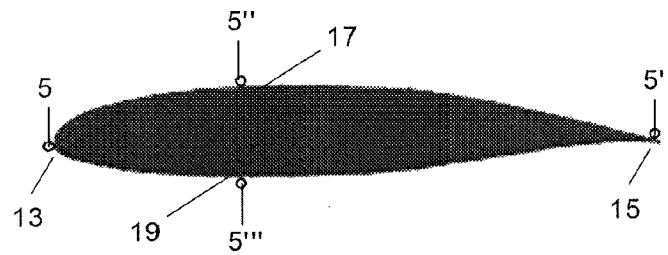
FIG. 4 shows a preferred sensor configuration to be used in certification tests.

In an embodiment of the present invention, illustrated in FIG. 4, which would provide a sufficient volume of strain data to comply with current certification requirements the system will comprise optical fibres 5, 5', 5", 5'" deployed longitudinally along the leading edge 13, the trailing edge 15, the upper cap 17 and the lower cap 19 in at least the 50% of the blade length.

Specific tests may require specific installations. For instance buckling estimation procedures are based upon the processing of strain data coming from fibres installed on top of blade trailing edge panels. For other purposes, as has been already mentioned, optical fibres running across the blade's longitudinal axis, running angled with regards to the blade's longitudinal axis, or combinations of some of the above-mentioned configurations may be needed.

Figure 5A:
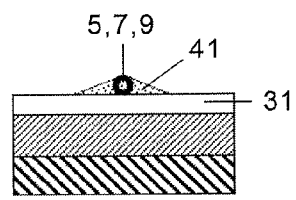
FIGS. 5a, 5b, 5c, 5d and 5e show schematic views of the optical fibre installed in the blade in different positions.

In an embodiment of the present invention illustrated in FIG. 5a, the optical fibres 5, 7, 9 are bonded to the outer skin 31 of the blade 11 by means of suitable bonding material 41 such as glue or a resin. Consequently the strains are measured on the outer skin of the blade. This embodiment has the advantage that allows a fast and simple installation of the optical fibres 5, 7, 9 in the blade and the disadvantage that the strains are measured on the blade's outer skin, which is not always structural and could have a particular strain distribution, and that the optical fibres 5, 7, 9 are barely protected against mechanical damage.

Figure 5B:
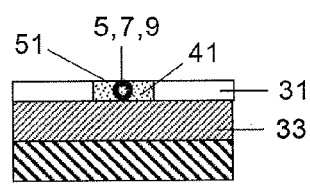
Figure 5C:
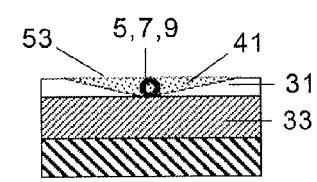

In the embodiments of the present invention illustrated in FIGS. 5b and 5c, the optical fibres 5, 7, 9 are bonded to the blade 11 in, respectively, grooves 51, 53 machined in outer skin 31 of the blade by means of suitable bonding material 41 such as glue or a resin. Consequently the strains are measured on the blade outer structural laminate 33. The machining of groove 51, of a rectangular section, enables less and more located blade alterations, whereas the machining of groove 53 of a triangular section is more intrusive but provides a smoother strain transition and could be performed faster.

Figure 5D:
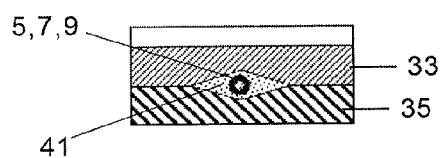

In the embodiment of the present invention illustrated in FIG. 5d the optical fibres 5, 7, 9 are embedded into the body of the blade 11 during its manufacturing process. They are bonded by means of a suitable bonding material 41 such as glue or a resin in a location between two structural laminates 33, 35 inside a single blade component.

Figure 5E:
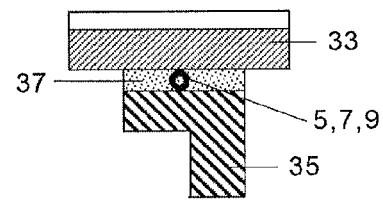

In the embodiment of the present invention illustrated in FIG. 5e the optical fibres 5, 7, 9 are embedded into the body of the blade 11 during its manufacturing process. They are embedded in a bonding layer 37 between two structural laminates 33, 35 of two blade components.

The commercially-produced, standard optical fibre used as strain sensor in the present invention may have different coatings (acrylated, polyamide, . . . ) depending particularly of how it is attached to blade.

In comparison with current strain measuring systems in static tests based on strain gauges, the system according, particularly, to the embodiments illustrated in FIGS. 5a, 5b and 5c has, among others, the following advantages:

An easier and faster installation. Current systems involve the installation of hundreds of strain gauges and the corresponding wire bundles. The system according to the present invention simply requires the installation of a few number of optical fibres along the blade. It is considered that 600 conventional gauges can be replaced by a single optical fibre. Installation times of a system according to the present invention are well below ¼ of those required for conventional strain gauges.

Cost reductions. The use of conventional telecommunications optical fibres drastically reduces sensor costs.

Although the present invention has been fully described in connection with preferred embodiments, it is evident that modifications may be introduced within the scope thereof, not considering this as limited by these embodiments, but by the contents of the following claims.

The invention claimed is:

1. Strain measuring system of wind turbine blades during the performance of static tests, comprising a plurality of mono-mode optical fibers, equipment for measuring strain at multiple locations in the mono-mode optical fibers using Rayleigh scattered light, each of said mono-mode optical fibers being attached to a blade subjected to the static tests for obtaining high spatial resolution measurements of strain on the blade during said tests.

2. Strain measuring system of wind turbine blades according to claim 1, wherein at least one of said optical fibers is disposed in a blade section extending in at least the 50% of a length of the blade in a longitudinal direction along the blade.

3. Strain measuring system of wind turbine blades according to claim 1, wherein at least one of said optical fibers is disposed in a blade section in a non-longitudinal direction.

4. Strain measuring system of wind turbine blades according to claim 1, wherein at least one of said optical is disposed in a blade section extending in at least the 50% of a length of the blade in a non-linear shape.

5. Strain measuring system of wind turbine blades according to claim 1, wherein said at least one of said optical fibers is disposed in one of the following directions:
along a leading edge of the blade;
along a trailing edge of the blade;
along an upper cap of the blade;
along a lower cap of the blade.

6. Strain measuring system of wind turbine blades according to claim 1, comprising four optical disposed, respectively, along a leading edge of the blade, a trailing edge of the blade, an upper cap of the blade and a lower cap of the blade.

7. Strain measuring system of wind turbine blades according to claim 1, wherein said optical fibers are bonded to outer skin of the blade.

8. Strain measuring system of wind turbine blades according to claim 1, wherein said optical fibers are bonded to the blade in grooves machined in outer skin of the blade.

9. Strain measuring system of wind turbine blades according to claim 1, wherein said optical fibers are embedded into two structural laminates.

10. Strain measuring system of wind turbine blades according to claim 1, wherein the equipment comprises a reflectometer that acquires backscattered optical signals from the fibers and converts the signals to strain data.

11. Strain measuring system of wind turbine blades according to claim 2, wherein the equipment comprises a reflectometer that acquires backscattered optical signals from the fibers and converts the signals to strain data.

12. Strain measuring system of wind turbine blades according to claim 3, wherein the equipment comprises a reflectometer that acquires backscattered optical signals from the fibers and converts the signals to strain data.

13. Strain measuring system of wind turbine blades according to claim 4, wherein the equipment comprises a reflectometer that acquires backscattered optical signals from the fibers and converts the signals to strain data.

14. Strain measuring system of wind turbine blades according to claim 5, wherein the equipment comprises a reflectometer that acquires backscattered optical signals from the fibers and converts the signals to strain data.

15. Strain measuring system of wind turbine blades according to claim 6, wherein the equipment comprises a reflectometer that acquires backscattered optical signals from the fibers and converts the signals to strain data.

16. Strain measuring system of wind turbine blades according to claim 7, wherein the equipment comprises a reflectometer that acquires backscattered optical signals from the fibers and converts the signals to strain data.

17. Strain measuring system of wind turbine blades according to claim 8, wherein the equipment comprises a reflectometer that acquires backscattered optical signals from the fibers and converts the signals to strain data.

18. Strain measuring system of wind turbine blades according to claim 1, wherein the equipment comprises a reflectometer that acquires backscattered optical signals from the fibers and converts the signals to strain data.

19. A method for measuring strain on wind turbine blades, comprising the steps of:
(a) providing a strain measuring apparatus comprising a plurality of mono-mode optical fibers, means for measuring strain at multiple locations in the mono-mode optical fibers by acquiring Rayleigh scattered light signals reflected from the fibers and converting the signals to strain data, each of said mono-mode optical fibers being attachable to a wind turbine blade for obtaining high spatial resolution measurements of strain on the blade;
(b) attaching the mono-mode optical fibers to the wind turbine blade and collecting strain data with said means from the mono-mode optical fibers in multiple locations; and
(c) receiving and processing the strain data to obtain measurements of strain on the blade.

* * * * *